United States Patent [19]
Hilpert et al.

[11] Patent Number: 5,831,514
[45] Date of Patent: Nov. 3, 1998

[54] CONTROL ARRANGEMENT FOR AN AUXILIARY HEATER IN MOTOR VEHICLES

[75] Inventors: Wolfgang Hilpert, Stuttgart; Manfred Stotz, Aichwald, both of Germany

[73] Assignee: Mercedes-Benz AG, Stuttgart, Germany

[21] Appl. No.: 764,389

[22] Filed: Dec. 13, 1996

[30] Foreign Application Priority Data

Dec. 13, 1995 [DE] Germany .................. 195 46 555.5

[51] Int. Cl.$^6$ .................................................. G08B 1/00
[52] U.S. Cl. .............................. 340/309.15; 340/825.69; 340/425.5; 219/202; 237/28
[58] Field of Search ................. 340/309.15, 925.69, 340/825.72, 425.5, 426; 236/15 BG, 68 R; 165/200, 11.2, 11.1; 219/202, 205; 364/424.045, 424.055; 392/441; 237/28; 123/179.2

[56] References Cited

U.S. PATENT DOCUMENTS

| | | | |
|---|---|---|---|
| 3,690,549 | 9/1972 | Hardy | 237/28 |
| 4,274,265 | 6/1981 | Okumura | 62/158 |
| 4,520,258 | 5/1985 | Grohmann | 219/202 X |
| 4,700,888 | 10/1987 | Samulak | 237/2 A |
| 4,843,384 | 6/1989 | Ide et al. | 340/825.69 |
| 4,874,921 | 10/1989 | Gerbig | 219/202 |
| 5,063,513 | 11/1991 | Shank et al. | 364/424.05 |
| 5,350,114 | 9/1994 | Nelson et al. | 237/2 A |
| 5,555,536 | 9/1996 | Rolf et al. | 340/309.15 |

FOREIGN PATENT DOCUMENTS

| | | |
|---|---|---|
| 25 18 444 | 11/1976 | Germany . |
| 30 24 983 | 1/1982 | Germany . |
| 88 06 572.3 | 9/1988 | Germany . |
| 43 15 379 | 4/1994 | Germany . |
| 195 15 353 | 10/1996 | Germany . |

OTHER PUBLICATIONS

Japanese Abstract No. 55–119540, vol. 004, No. 169 (M–043), Sep. 13, 1980.

Primary Examiner—Jeffrey A. Hofsass
Assistant Examiner—Anh La
Attorney, Agent, or Firm—Evenson, McKeown, Edwards & Lenahan, P.L.L.C.

[57] ABSTRACT

A control arrangement for an auxiliary heater in motor vehicles is provided which consists of a preselection clock, a control unit and a control apparatus which are all arranged inside the vehicle, in which case the auxiliary heater can be time-programmed by way of the preselection clock. A time generator is used which generates a time signal representing the actual time and whose time signal is supplied to the preselection clock as well as to a time display arranged in the vehicle, and in the case of which the time programming is carried out via a portable transmitter.

16 Claims, 1 Drawing Sheet

CONTROL ARRANGEMENT FOR AN AUXILIARY HEATER IN MOTOR VEHICLES

BACKGROUND AND SUMMARY OF THE INVENTION

This invention relates to a control arrangement for an auxiliary heater in motor vehicles and, more particularly, to a control arrangement for an auxiliary heater in motor vehicles including a preselection time module, a control unit, and a control apparatus, which are all arranged inside the vehicle. The auxiliary heater is time-programmable by way of the preselection time module.

Such a control arrangement for an auxiliary heater is known from German Patent document DE 43 15 379 C1, in the case of which the operation of a heater can be started by a time-programmable preselection clock, an immediate-heating button or by a remote control.

It may be considered to be a disadvantage in this case that for controlling the auxiliary heater, in addition to the clock already installed in the vehicle, a switch clock must be installed which is designed as a preselection clock. As a result, when the change takes place from summer time to winter time and vice-versa, and when travelling through time zones, two clocks must be newly set. In addition, it is not possible to carry out a time programming of the preselection clock by means of the remote control.

It is an object of the present invention to further develop such a control arrangement for an auxiliary heater in such a manner that the control comfort of the auxiliary heater is increased and, at the same time, the additional switch clock is saved.

According to the present invention, this object is achieved by a control arrangement for an auxiliary heater in motor vehicles including a preselection time module, a control unit, and a control apparatus, which are all arranged inside the vehicle. The auxiliary heater is time-programmable by way of the preselection time module. In a time generator, a time signal is generated which represents the actual time. The time signal of the time generator is supplied to the preselection time module as well as to a time display arranged in the vehicle.

According to the invention, this object is achieved in that a time generator which generates a time signal representing the actual time, and which may be a part of the clock already installed in the vehicle, is used in order to supply the time signal to the time display of the clock already installed in the vehicle as well as to a programmable preselection time module. In addition, the time display of the clock already installed in the vehicle can be used for displaying the desired switch-on time at least during the programming operation or devices can be provided for displaying the programmed switch-on times, as required. The preselection time module consists of at least one memory for receiving the programmed switch-on times and of a comparator which continuously compares the time signal with the programmed switch-on times. If the stored program switch-on time matches the time signal, then a switch-on signal is generated. The switch-on signal is transmitted to a signal detection and analysis module which, by means of the control apparatus, takes over the control of the heater.

In a particularly advantageous embodiment, the time generator and the time display are part of a clock integrated in the combination instrument and the preselection time module and the signal detection and analysis module are integrated in the control apparatus. The required time signal will then be transmitted by the data bus from the time generator to the comparator.

However, it is also contemplated to combine the time display of the clock already installed in the vehicle, the time generator and the preselection time module in a subassembly and to integrate it in the combination instrument.

The actual control of the auxiliary heater takes place by a remote control device which consists of a transmitter and a receiver.

Furthermore, for example, in the case of a failure of the remote control, it is possible to switch the auxiliary heater on or off or to erase programmed switch-on times again by way of a control unit arranged in the vehicle. The control unit is therefore only used for the emergency control of the auxiliary heater and can therefore also be housed in a depositing compartment.

Advantageously, after a certain time period, the control apparatus will automatically switch off the heater again unless the auxiliary heater was switched off previously by the remote control or the control unit.

In addition, signalling devices are provided in the vehicle which signal different operating conditions of the auxiliary heater. In particular, the user is to be informed about the operating conditions "auxiliary heater on" and "switch-on time programmed". The signalling of the operating condition "switch-on time programmed" is important because auxiliary heaters may not be operated at every location and the user must therefore cancel already programmed switch-on times before parking the vehicle. The signalling devices can be constructed as visual display devices, such as luminous diodes, and/or as acoustic signal generators. In an advantageous embodiment, the signal generators are integrated in the control apparatus arranged in the vehicle. However, other installation sites, such as the combination instrument, are also conceivable.

Other objects, advantages and novel features of the present invention will become apparent from the following detailed description of the invention when considered in conjunction with the accompanying drawings.

BRIEF DESCRIPTION OF THE DRAWING

The figure is a schematic block diagram of a control arrangement for an auxiliary heater according to the invention.

DETAILED DESCRIPTION OF THE DRAWING

Figure 1:
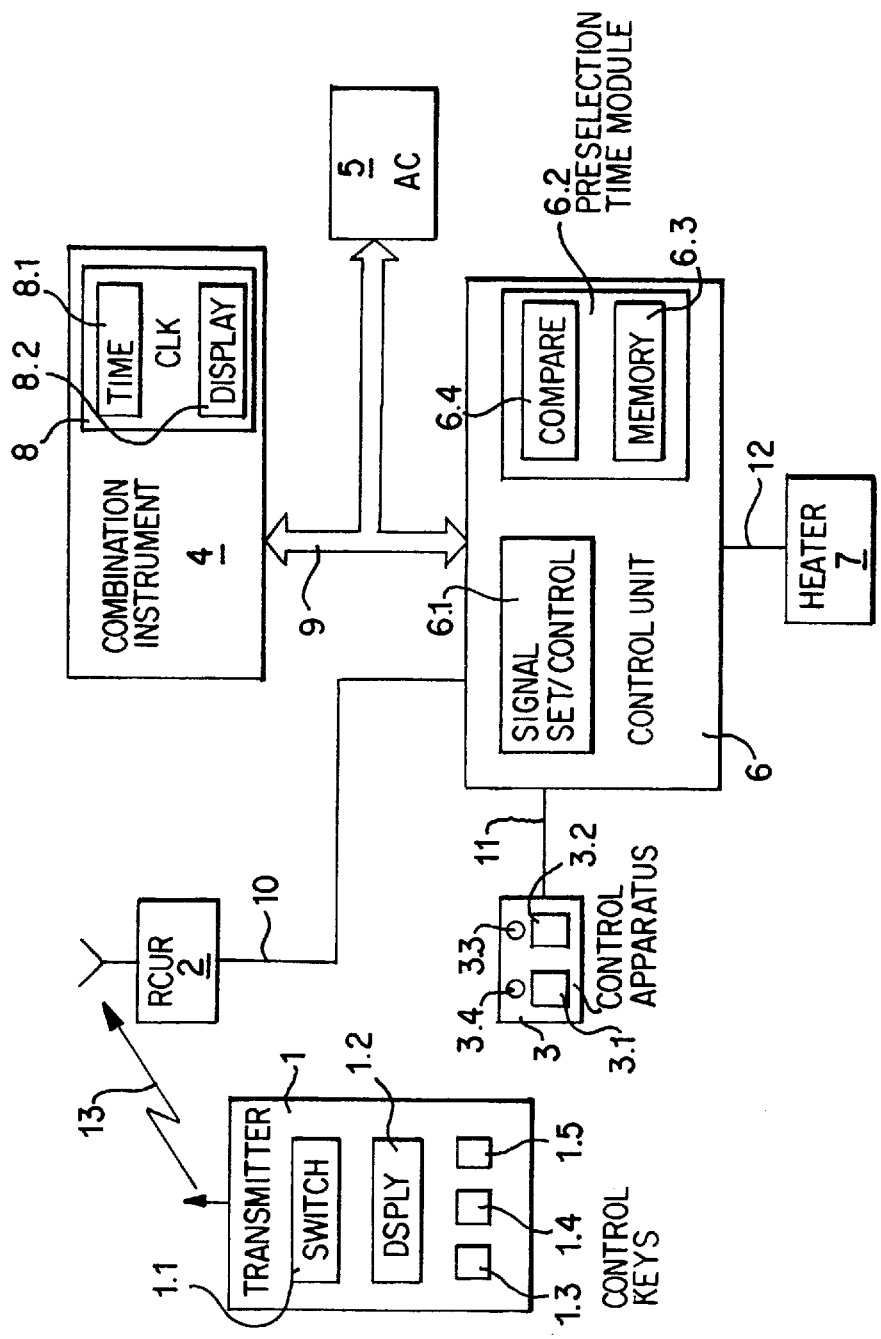

The figure is a schematic block diagram of a control arrangement for an auxiliary heater according to the invention. As illustrated in the drawing, the control arrangement consists of a portable transmitter 1, of a receiver 2 of a control apparatus 3, of a clock 8 with a time generator 8.1 and a time display 8.2 installed in the combination instrument 4; of a control unit 6 with the signal detection and control module 6.1 and the integrated preselection time module 6.2 which consists of a memory 6.3 and a comparator 6.4; and of a data bus 9 as well as of different electric connections 10, 11, 12. In is addition, an air-conditioning control apparatus 5 and a heater 7 are illustrated.

The arrangement shown in the figure allows for the following method of operation for controlling the auxiliary heater. All signals for controlling the auxiliary heater generated by the portable transmitter 1 are transmitted by way of the transmission path 13 to the receiver 2 fixed to the vehicle (not shown). By way of the electric connection 10, which may be constructed as a data bus, the signals are transmitted to the signal detection and control module 6.1 in the control unit 6. All signals for controlling the auxiliary heater are detected and analyzed in the signal detection and control module 6.1. After the analysis, the signal detection and analysis module 6.1 initiates the actions corresponding to the intended meaning of the control signals. The control unit 6 can be an appropriately programmed microprocessor, a hard-wired logic circuit, or any combination thereof.

For programming the switch-on times, the transmitter contains three control keys 1.3–1.5 and one transmitter display 1.2. In the embodiment shown, one of the control keys is constructed as a programming key 1.3. By means of this key 1.3, the already programmed switch-on times can be called consecutively in the roll mode (scroll) and can be displayed on the transmitter display 1.2. During the first operation of the programming key 1.3, the transmitter display 1.2 is switched on and the first switch-on time is displayed. When the key is operated again, the second switch-on time is displayed, etc. The storing of a desired switch-on time takes place in the keyed condition by the operation of an on/off switch 1.1, which is also part of the transmitter 1. The desired switch-on time is transmitted as the switch-on time signal from the transmitter 1 by way of the transmission path 13, the receiver 2 and the electric connection 10 to the signal detection and analysis module 6.1 in the control apparatus 6.

There, the switch-on time signal is written as the desired switch-on time into the memory 6.3 of the preselection time module 6.2. In order to generate a switch-on signal at the desired switch-on point in time, the output of the memory 6.3 is connected with an input of the comparator 6.4. By way of the signal detection and analysis module 6.1 and the data bus 9, a time signal is supplied to another input of the comparator, which time signal is generated by the time generator 8.1 and represents the actual time. The comparator 6.4 continuously compares the memory content with the time signal and, in the case of a coinciding match, supplies a switch-on signal to the signal detection and analysis module 6.1. Then the signal detection and analysis module 6.1 causes the control apparatus 6 to control the corresponding assemblies, such as the heater 7, by way of the electric connection 12, and/or the air-conditioning control apparatus 5 by way of the data bus 9. Then the signal detection and analysis module 6.1 erases the corresponding stored switch-on time from the memory 6.3.

After a switch-on operation, the control apparatus 6, after a certain time period, for example, one hour, switches the controlled assemblies (heater 7, air-conditioning control apparatus 5) off again.

The two other control keys are used for changing the switch-on time illustrated on the transmitter display 1.2. In this case, one control key is constructed as a forward control key 1.4 for incrementing the displayed time and another control key as the reverse control key 1.5 for decrementing the displayed time. However, in principle, other processes are also conceivable for setting the desired switch-on time. Thus, for example, the forward control key 1.4 can be constructed as an H-control key for programming the hours and the reverse control key 1.5 can be constructed as an M-control key for programming the minutes. When the corresponding control key is operated, the pertaining display is incremented by 1 until the corresponding control key is released again, in which case the hour display can assume values of from 00 to 23, and the minute display can assume values of from 00 to 59. During the programming, the transmitter display 1.2 will display the set times.

In the described embodiment, up to three different switch-on times can be programmed. If, within a certain time period, for example, 10 seconds, none of the three control keys is operated, the transmitter display 1.2 will automatically switch off.

However, the transmitter 1 contains no clock but the times indicated on the transmitter display 1.2 are only desired switch-on times.

If a programmed switch-on time is not to be changed but is to be erased, in the embodiment, the programming key 1.3 must be operated until the switch-on time which is to be erased is displayed on the transmitter display 1.2. Then the forward control key 1.4 and the reverse control key 1.5 must be operated simultaneously. As a result, the displayed switch-on time on the transmitter display 1.2 is erased. By means of the operation of the on/off switch 1.1, the corresponding erase signal is transmitted from the transmitter 1 by way of the transmission path 13, the receiver 2 and the electric connection 10, to the signal detection and analysis module 6.1 in the control apparatus 6. After the analysis of the erase signal, the signal detection and analysis module 6.1 erases the corresponding stored switch-on time from the memory 6.3.

As an additional control function, independently of the programmed switch-on times, the auxiliary heater can immediately be switched on and off by means of the transmitter 1.

For this purpose, the on/off switch 1.1, which is constructed, for example, as a rocker key, must be operated when the transmitter display 1.2 is switched off. The transmitter 1 will then generate a corresponding switch-on or switch-off signal which is transmitted by way of the transmission path 13, the receiver 2 and the electric connection 10 to the signal detection and control module 6.1 in the control apparatus 6.

The signal detection and analysis module 6.1 then causes the control apparatus to control the corresponding assemblies, such as the heater 7, by way of the electric connection 12 and/or the air-conditioning control apparatus 5 by way of the data bus 9.

After a switch-on operation, the control apparatus 6, after a certain time period, for example, one hour, switches off the controlled assemblies (heater 7, air-conditioning control apparatus 5).

In addition to using the remote control, it is possible to operate the auxiliary heater by way of the control apparatus 3. For this purpose, the control apparatus 3 contains an on/off switch 3.1 which may be constructed as a rocker switch and, when operated, generates a corresponding switch-on or switch-off signal, and an erase switch 3.2 which, when operated, generates an overall erase signal for erasing the programmed switch-on times. The control signals of the control unit are transmitted by way of the electric connection 11, which may be constructed as a data bus, to the signal detection and control module 6.1 in the control apparatus 6.

The signal detection and control module 6.1 detects the different control signals and analyzes them. In the case of an overall erase signal, all stored switch-on times are erased from the memory 6.3.

In the case of a switch-on or switch-off signal, the signal detection and control module causes the control apparatus 6 to control the corresponding assemblies. After a switch-on operation, the control apparatus 6, after a certain time period, for example, one hour, switches the controlled assemblies off again.

In addition, the control unit 3 in the vehicle contains, as the signalling devices, a first luminous diode 3.3 which visually signals the operating condition "switch-on time programmed", and a second luminous diode 3.4 which visually signals the operating condition "auxiliary heater on".

The following sequence takes place. After the desired switch-on time is written into the memory 6.3 of the preselection time module 6.2, by way of the electric connection 11 which can be constructed as a data bus, the first luminous diode 3.3 in the control unit 3 is controlled. Only when all desired switch-on times are erased again from the memory 6.3 is the control of the first luminous diode terminated.

After a switch-on operation has taken place, by way of the electric connection 11, the second luminous diode 3.4 in the control unit 3 is controlled. After a switch-off operation has taken place, the control of the second luminous diode 3.4 in the control unit 3 is terminated.

However, other possibilities of controlling the two luminous diodes 3.3 and 3.4 are also contemplated. Thus, the two luminous diodes 3.3 and 3.4 may be constructed, for example, to be flashing in order to visually intensify the display.

Furthermore, it is possible to inform the user of a still programmed switch-on time only when the engine is being switched off.

As a further embodiment, the switch-on times stored in the memory 6.3 can be displayed on the time display 8.2 at least when being written into the memory 6.3. For this purpose, the signal detection and analysis module 6.1 would have to transmit the switch-on time by way of the data bus 9 for the time display in the clock already installed in the vehicle.

In addition, an operating device can be provided in the vehicle by means of which, as required, the display of the stored switch-on times is caused on the time display 8.2. As an additional embodiment, it is contemplated to integrate the remote control function of the auxiliary heater into the already existing remote control for the different vehicle functions (such as the central locking system, the comfort closing system, etc.) so that only one transmission unit is required for the remote control of the various vehicle functions.

It will be readily understood by those of ordinary skill in the art that the various control units can be microprocessor controlled via appropriate programming in order to perform the functions stated herein. Alternatively, the apparatus can be a hard-wired logic circuit for performing the described functions. Of course, it is possible to provide a combination of a programmed general purpose processor together with various hard-wired logic circuits.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A control arrangement for an auxiliary heater in a motor vehicle, comprising:
   a first control unit;
   a preselection time module;
   a second control unit coupled to said first control unit, said preselection time module and said first and second control units being arranged inside the vehicle, wherein the auxiliary heater is time-programmable by way of said preselection time module;
   a single time generator located within the vehicle providing a time signal representing an actual time as a vehicle clock signal, said time signal of said single time generator being supplied to said preselection time module; and
   a vehicle clock time display for the vehicle clock signal arranged in the vehicle, said time signal of said single time generator being also separately supplied to said vehicle clock time display to display the actual time.

2. The control arrangement according to claim 1, further comprising a memory in said first control unit, wherein said time display is used at least during a time programming of the preselection time module as a display for a desired switch-on time fed into said memory.

3. The control arrangement according to claim 1, further comprising a transmitter having a transmitter display, an on/off switch, a programming key, a forward control key, and a reverse control key;
   wherein time programming of the preselection time module is performed via said transmitter which permits several desired switch-on times to be programmed.

4. The control arrangement according to claim 3, wherein at least during the time programming of the preselection time module, the transmitter display displays said desired switch-on time.

5. The control arrangement according to claim 3, wherein different programmed switch-on times are called in a roll-mode via said programming key and displayed on said transmitter display.

6. The control arrangement according to claim 3, wherein said transmitter further comprises additional control elements for controlling other vehicle assemblies.

7. The control arrangement according to claim 1, wherein said preselection time module comprises a memory and a comparator operatively coupled together.

8. The control arrangement according to claim 1, wherein said preselection time module is integrated in said first control unit.

9. The control arrangement according to claim 1, wherein said time generator and said time display are combined to form a clock.

10. The control arrangement according to claim 9, wherein said clock is part of a combination instrument.

11. The control arrangement according to claim 1, wherein said time display, said time generator, and said preselection time module are combined to form an assembly.

12. The control arrangement according to claim 11, wherein said assembly is part of a combination instrument.

13. The control arrangement according to claim 1, further comprising at least one signalling device provided in said second control unit, said at least one signalling device emitting signals which signal an operating condition of the auxiliary heater.

14. A method for operating an auxiliary heater in a motor vehicle including a preselection time module, a first control unit, and a second control unit all arranged inside the vehicle, the method comprising the steps of:
   generating an actual time signal as a vehicle clock signal in a single time generator;
   supplying said actual time signal to both the preselection time module and a vehicle clock time display for the clock signal arranged in the vehicle;
   time-programming the auxiliary heater for operation via said preselection time module.

15. The method according to claim 14, wherein the time-programming step further comprises the steps of:

transmitting several desired switch-on times via a transmitter to said preselection time module; and displaying said desired switch-on time on the transmitter display at least during time-programming of the preselection time module.

16. A control arrangement for an auxiliary heater in a motor vehicle, comprising:

a first control unit;

a preselection time module;

a second control unit coupled to said first control unit, said preselection time module and said first and second control units being arranged inside the vehicle, wherein the auxiliary heater is time-programmable to switch-on at a plurality of different times by way of said preselection time module;

a single time generator located within the vehicle providing a time signal representing an actual time as a vehicle clock signal, said time signal of said single time generator being supplied to said preselection time module; and a vehicle clock time display for the clock signal arranged in the vehicle, said time signal of said time generator being also separately supplied to said vehicle clock time display to display the actual time.

* * * * *